United States Patent [19]
Wilcox et al.

[11] Patent Number: 5,942,127
[45] Date of Patent: Aug. 24, 1999

[54] FUEL OIL TREATMENT UNIT AND ASSOCIATED METHOD

[76] Inventors: Steven Ian Wilcox; James Robert Wilcox, both of 111 Daniels Welch, Coffee Hall Estate, Milton Keynes, United Kingdom

[21] Appl. No.: 08/933,049

[22] Filed: Sep. 18, 1997

Related U.S. Application Data

[63] Continuation-in-part of application No. 08/619,700, filed as application No. PCT/GB93/01986, Sep. 21, 1993, abandoned.

[51] Int. Cl.[6] .................................................. C02F 1/72
[52] U.S. Cl. ..................... 210/762; 210/763; 210/766; 210/774; 210/806
[58] Field of Search ................................ 210/762, 763, 210/766, 774, 806

[56] References Cited

U.S. PATENT DOCUMENTS

| | | | |
|---|---|---|---|
| 3,792,519 | 2/1974 | Haver | 29/163.5 F |
| 3,956,071 | 5/1976 | O'Brien | 210/180 |
| 4,089,662 | 5/1978 | Williams | 210/104 |
| 4,711,204 | 12/1987 | Rusconi | 123/142.5 R |
| 4,894,140 | 1/1990 | Schön | 208/72 |
| 4,943,352 | 7/1990 | Lefebvre et al. | 210/184 |
| 5,149,433 | 9/1992 | Lien | 210/805 |
| 5,391,304 | 2/1995 | Lantos | 210/774 |

FOREIGN PATENT DOCUMENTS

| | | |
|---|---|---|
| 2140316 | 11/1984 | United Kingdom . |
| 8000222 | 2/1980 | WIPO . |

*Primary Examiner*—Jay H. Woo
*Assistant Examiner*—Betsey J. Morrison
*Attorney, Agent, or Firm*—Fildes & Outland, P.C.

[57] ABSTRACT

A fuel oil treatment unit and associated method for removing undesirable contaminants from a fuel oil, such as diesel oil, being delivered to an associated engine, such as a vehicle diesel engine. The invention includes, inter alia, a unit for treating contaminant-containing fuel oil, comprising means for heating the fuel oil to a temperature sufficient to volatilize at least some of the contaminants and, also, means for filtering the so-heated fuel oil, to remove therefrom at least some of the remaining, unvolatilized contaminants. Optionally, the previously-heated and filtered fuel oil is passed to a temperature control means for maintaining or returning the temperature of the fuel oil to a desired level. The inventive fuel oil treatment unit can be used as an intelligent system capable of delivering the precise amount of fuel oil at the required temperature and viscosity, regardless of external influences from the environment or other influences resulting from the operational demands of an associated engine to which the treated fuel oil is subsequently delivered.

1 Claim, 12 Drawing Sheets

FUEL OIL TREATMENT UNIT AND ASSOCIATED METHOD

This application is a continuation-in-part of our U.S. patent application Ser. No. 08/619,700 filed on Mar. 26th 1996, now abandoned, entitled "Fluid Filter Device" and derived from our International Patent Application No. PCT/GB93/01986 (Publication No. WO 95/08384) also entitled "Fluid Filter Device".

FIELD OF THE INVENTION

The present invention relates to a unit for, and an associated method of, treating a fuel oil, such a diesel oil, to remove contaminants therefrom but may also relate to such a unit and associated method for so-treating other types of fuel oil, such as those for heating purposes. However, the invention is especially, but not exclusively, related to a treatment unit for, and an associated method of, treating diesel oil being supplied from a storage tank or other supply thereof to a diesel engine of a vehicle, for example, a truck or railroad power unit or a stationary diesel engine for generating electrical or mechanical power. Also, the inventive unit and associated method could be applicable to the treatment of gasoline being supplied to gasoline engines.

BACKGROUND AND PRIOR ART

Diesel oil is obtained from crude oil in substantially the same manner as most other petroleum bi-products, such as gasoline, distilled therefrom. Each such bi-product has its own boiling point and is obtained by separating it from the other components of the crude oil by condensing it from the main crude distillate at a predetermined temperature.

Modern, crude oil refining technology has failed to isolate many of the hydrocarbons at each distillation stage and, as a consequence, diesel oil is collected as a condensate contaminated with both lighter and heavier hydrocarbons, various types of aromatics, benzenes, dioxins and, in certain circumstances, particulate material.

Also, the collected diesel oil can be contaminated with water whose content can be increased during subsequent storage, transportation and distribution of the diesel oil.

Efforts to remove these contaminants by, say, heating or chemical reacting the collected diesel oil have been substantially unsuccessful, mainly because the chemical composition and/or physical properties of the diesel oil itself tend to be changed as a result.

Although unwanted particulates in diesel oil are generally extremely small, they still tend to have an abrasive effect on the various components, such as, injectors, exhaust valves, pistons and cylinder walls, of diesel engines. Also, these particulates tend not to burn with the diesel oil during the combustion process and, as a consequence, the power ratios of the diesel engines are correspondingly decreased and the level of harmful exhaust emissions is correspondingly increased.

Further, harmful exhaust emissions, resulting from the combustion or partial-combustion of other diesel oil contaminants, such as at least some of those discussed above, can lead to undesirable atmospheric pollution.

Chemical additives, whether synthetic or natural, can be used in diesel oil as so-called "masking agents", in an attempt to eradicate the problem of pollution caused by the fully or partially combusted contaminants inherent in diesel oil. However, it has been found that these chemical masking agents only help to create other pollution problems when exhausted to the atmosphere after the combustion process.

SUMMARY OF THE INVENTION

The presently-inventive treatment unit and method have been designed to eliminate, or at least substantially reduce, the disadvantages associated with the subsequent combustion of existing diesel oils and other fuel oils by removing therefrom contaminants which are present in the oil collected from the refining process and, possibly also, any undesirable chemical masking agents which may be added to the oil after its collection, as well as any contaminating water which may be present at point of delivery.

Also, the invention sets out to provide a treatment unit and associated method which eliminates, or at least substantially reduces, the need for the addition of chemical additives, such as, masking agents, whilst also providing a fuel oil, such as diesel oil, which, having been treated in accordance with the invention, provides a fuel which:

burns readily at all operating temperatures;

is free from waxes and other contaminants including particulates;

provides a balance between so-called "front end" and "back end" volatility;

has a substantially constant specific gravity;

has a low viscosity; and has a high Cetane rating

The present invention is also designed to provide a compact, self-contained unit which can be installed readily within the fuel line of an existing fuel oil burning installation, for example, in the fuel line between the fuel tank and engine, such as, the diesel engine, of a vehicle or stationary installation, such as, an electrical or mechanical power generator.

Accordingly, one aspect of the invention resides in a method of treating a fuel oil containing contaminants, comprising heating the fuel oil to a temperature sufficient to volatilize at least some of the contaminants contained therein and subsequently filtering the heated fuel oil to remove therefrom at least some of the remaining, unvolatilized contaminants therein.

Preferably, the volatilized contaminants are removed from the heated fuel oil for subsequent exhaustion to the atmosphere or a suitable container in which the volatilized contaminants form condensates for subsequent disposal.

The fuel oil is preferably heated to a temperature in the range of 100° C. to 250° C., more preferably 120° C. to 200° C., to volatilize contaminants, such as any water, lighter hydrocarbons and/or dioxins whose respective boiling points lie in that range, whilst the fuel oil being heated may also be subjected to pressure, preferably in the range of 80 psi to 300 psi.

Further, it has been found advantageous to agitate the fuel oil being heated, to assist, it is thought, in the weakening of molecular bonding between the constituents of the fuel oil and at least some of the contaminants contained therein. Such agitation may be effected by precision engineering the means for heating the fuel oil and any pressurization thereof, at least the latter being effected by, say, a suitable pump, such as a hydraulic pump, and/or by other agitating means, such as baffles or fins, in at least part of the path of the fuel oil being heated.

After heating of the fuel oil and the resulting volatilization of at least some of the contaminants contained therein, filtering of the previously-heated fuel oil is carried out, preferably initially catalytically, for example, by a catalytic metal strainer, preferably in the form of a woven nickel-copper mesh having, preferably, a porosity in the range of 5 microns to 10 microns. Such catalytic filtering removes from the fuel oil at least some of the remaining contaminants therein, for example, mainly aromatic compounds and at least some of any remaining dioxins.

Also, it has been found that this initial catalytic filtering either increases bonding between certain contaminants within the fuel oil, whilst also reducing such bonding between other contaminants. Bonding between molecules of aromatic contaminants tends to be increased, to form heavier aromatic compounds.

Additionally or alternatively, but preferably the former, a mechanical filter is provided, optionally downstream of the catalytic filter, to remove from the heated fuel oil those heavier aromatic compounds, as well as any particulates.

Preferably, the pore size of the mechanical filter is graduated, either continuously or stepwise, in a decreasing manner from, say, 3 microns to 0.3 microns.

Filtering by the mechanical filter removes contaminants from the fuel oil by one or both of two ways, namely, by physical retention, for example, the heavier aromatic compounds formed at the catalytic filter or by absorption of other contaminants or both.

The preferred material of the mechanical filter is polypropylene, such as may be provided in cartridge form.

After filtration of the fuel oil, the fuel oil is effectively "reconstituted" by cooling, such as rapid cooling, or heating, such as by boost heating, as is necessary to maintain or return the fuel oil to an optimum temperature and viscosity suited to the particular type of engine to which it is subsequently delivered via, say, a fuel line and injectors.

In accordance with another aspect of the invention, there is provided a unit for treating contaminant-containing fuel oil, comprising means adapted to heat the fuel oil to a temperature sufficient to volatilize at least some of the contaminants contained therein, and means adapted to filter the so-heated fuel oil to remove therefrom at least some of the remaining, unvolatilized contaminants therein. Preferably, the unit also comprises means adapted to remove, preferably by exhaustion, volatilized contaminants from the heated fuel oil.

The fuel oil heating means is preferably adapted to heat the fuel oil to a temperature in the range of 100° C. to 250° C., more preferably 120° C. to 200° C., to volatilize contaminants, such as any water, lighter hydrocarbons and/or dioxins whose respective boiling points lie in that temperature range. Also, the fuel oil treatment unit may comprise means adapted to subject the fuel oil being heated to pressure, preferably in the range of 80 psi to 300 psi.

Advantageously, the unit further comprises means adapted to agitate the fuel oil being heated by said heating means. Such agitation means may reside in the configuration of said fuel oil heating means and any attendant pressurization means. Such pressurization means may comprise a pump, such as a hydraulic pump, adapted to cause the fuel oil to come in contact with said heating means. Additionally or alternatively, such agitation means may comprise baffles or fins located in at least part of the path of the fuel oil being heated.

The purpose of agitating the fuel oil is, as discussed above, to assist in the weakening of molecular bonding between the constituents of the fuel oil and at least some of the contaminants contained therein.

In a preferred embodiment of the inventive fuel oil treatment unit, the unit further comprises, downstream of the heating means, filtering means adapted to remove at least some of the remaining contaminants in the fuel oil. Such filtering means may comprise catalytic filtering means, for example, a catalytic metal strainer which is preferable in the form of a woven nickel-copper mesh having, preferably, a porosity in the range of 5 microns to 10 microns. The contaminants removed from the heated fuel oil by that catalytic filtering means mainly comprise aromatic compounds and at least some of any remaining dioxins.

Additionally or alternatively, and preferably in the former, said filter means comprises, either upstream or downstream of the catalytic filtering means, preferably the latter, mechanical filtering means arranged to remove from the heated fuel oil heavier aromatic compounds, as well as any particulates. Preferably, the pore size of said mechanical filtering means is graduated, either continuously of stepwise, in a decreasing manner from, say, 3 microns to 0.3 microns.

As discussed above, filtering by said mechanical filter means removes contaminants from the fuel oil by one or both of two ways, namely, either by physical retention, for example, the heavier aromatic compounds which may be formed at said catalytic filter means, by absorption of other remaining contaminants, or both.

The preferred material of said mechanical filter means is polypropylene, such as that provided in cartridge form.

Downstream of said filtering means, the inventive fuel oil treatment unit may comprise further means adapted to control the temperature of the heated and filtered fuel oil, by maintaining or returning the previously heated and filtered fuel oil to an optimum temperature and viscosity suited to the particular type of engine to which the fuel oil is to be delivered subsequently, via, for example, a fuel line and injectors. Such further, temperature control means may comprise cooling means adapted to reduce the temperature of the previously heated and filtered fuel oil to the required temperature. Alternatively, such further means may comprise additional heating means adapted to increase the temperature of the previously heated and filtered fuel oil to that required.

In the preferred embodiment of inventive fuel oil treatment unit to be described in more detail hereinbelow, the heating means, filtering means and temperature control means are housed in respective chambers, with the chamber housing the filtering means being located downstream of the chamber housing the heating means and, in turn, with the chamber housing the temperature control means being located downstream of the chamber housing the filtering means.

Respective pipes are provided to connect the output of the chamber housing the heating means to the input of the chamber housing the filtering means, as well as other piping for connecting the output of the chamber housing the filtering means to the input of the chamber housing the temperature control means. An input for the chamber housing the heating means is also provided, together with an output for the chamber housing the temperature control means.

Preferably, the three chambers of the preferred embodiment of fuel oil treatment unit are located in juxtaposition with respect to each other and are, accommodated in a single casing, to provide a unitary self-contained unit. In a modification of that arrangement for the three chambers, the chamber housing the filtering means and the chamber housing the temperature control means may be separated by a gap of desired dimensions, through which a cooling medium, such as cold water or air, or a heating medium, such as hot water or air, can be passed to at least assist in the cooling or heating of the previously heated and filtered fuel oil. Also, the chamber housing the temperature control means may be provided with external cooling fins.

When in the form of a self-contained unitary unit, such as that described above in relation to the preferred embodiment to be described hereinbelow, it may be connected operably in the existing fuel line of, say a vehicle, between the fuel tank and engine thereof, with at least the heating means, when in the form of electrical heating means, being connected in a suitable manner to the electrical power supply of the vehicle.

The inventive fuel oil treatment unit may also be provided with a pump for passing untreated fuel oil to the heating means, for example, via the input of the corresponding chamber housing such means. A non-return valve may be provided in the associated piping between that pump and the chamber housing the heating means, whilst an accumulator or ballast may also be provided downstream of any non return valve, to ensure that, during operational use of the unit, the internal pressure thereof is maintained at a required level, regardless of the operating requirements of the engine to which the treated fuel oil is eventually delivered.

Further, the contaminants volatilized by the heating means and removed from the heated fuel oil may be exhausted, for example, from the chamber housing the heating means, to atmosphere via another non-return valve.

The output of the chamber housing the temperature control means may be connected, downstream thereof and via suitable piping, to a valve, such as, a proportionality valve, for controlling the required amount of fuel to be injected or otherwise delivered to the associated engine to provide optimum running thereof.

The inventive unit can be designed as an "intelligent" system capable of delivering the precise amount of fuel at the required temperature and viscosity, regardless of external influences from the environment or other influences resulting from the operational demands of the associated engine. To achieve this, the unit may be fitted with a processor (IMPU) programmed to monitor the operation of the unit as well as that of the associated engine, in combination with, say, the conventional engine management processor module (EMPM) of the vehicle, and connected to various electrical components of the fuel oil treatment unit.

For example, a bi-directional pressure control valve may be connected to the IMPU, for controlling the accumulator or ballast, whilst also providing a control signal for the motor of the pressurization pump. That control signal to the pump motor ensures that the pump produces the required flow of fuel oil through the unit, thereby maintaining the correct pressure within the treatment unit.

Operation of the heating means in the first, heating chamber can be controlled from the IMPU, whilst operation of further heating means in the third, temperature control chamber can be controlled in a similar manner.

A temperature sensor located adjacent the outlet of the third, temperature control chamber may have its output connected to the IMPU. Similarly, a pressure sensor adjacent the outlet of the third, temperature control chamber may have its output connected to the IMPU.

The IMPU may be connected to a controller providing an interface for the IMPU with the EMPM of the vehicle.

A fuel oil flow rate sensor, which is preferably incorporated in a proportionality valve downstream of the outlet of the third, temperature control chamber, may have its output connected to the IMPU.

Such proportionality valve may be controlled by he IMPU, for adjustment of that valve between its fully open and fully closed positions in a continuous manner.

A fuel level sensor may have its signal output connected to the IMPU and be incorporated in the fuel tank of the vehicle. As the inventive treatment unit should preferably not be emptied of fuel oil, under normal working conditions, then a "low fuel" warning is provided when only, say, 5 liters of diesel oil are detected in the fuel tank. When only, say, 2 liters of fuel oil are so-detected by the sensor, then the treatment unit may be closed down to stop the engine of the vehicle, as if the vehicle had run out of fuel.

A pressure sensor which is preferably located exterior of the filter means in, say, the second, filter chamber, preferably downstream thereof, may have its output connected to the IMPU.

A thermistor probe, which can extend generally coaxially of the filter means in, say, the second chamber and can act as a temperature sensor, preferably has its output connected to the IMPU. The temperature of the fuel oil sensed by that thermistor probe may be used to control the heater means in the first, heating chamber.

As an integrated unit, the IMPU can monitor continuously all conditions of the fuel oil being treated by the inventive unit, to maintain optimum fuel oil flow rates, temperature and viscosity thereof, as required by the engine to which the treated fuel oil is delivered. Optimum levels of fuel oil characteristics and precise quantities thereof may be controlled by constant feedback information from the EMPM of the vehicle and, inter alia, the temperature, pressure, flow rate and fuel oil level sensors whose outputs are fed to the IMPU.

Power for the IMPU is preferably provided from an exterior source, such as the battery of a vehicle via a switch and a power relay.

Further features of the inventive fuel oil treatment unit and associated IMPU will be described in more detail hereinbelow with regard to the preferred embodiment.

DETAILED DESCRIPTION OF THE PREFERRED EMBODIMENT

Referring firstly to FIGS. 1 to 6 of the accompanying drawings, a unit, indicated generally at 1, for treating diesel oil to be delivered, for example, by means of injectors (not shown) to an associated diesel engine (also not shown), comprises an outer casing 2 in which is accommodated three separate chambers indicated generally at 100, 200 and 300, respectively.

The first chamber 100 is generally cylindrical and has an inlet 101 extending through its side wall 102 adjacent its base 103, for connection, via a suitable coupling 3 and associated piping (not shown) to the fuel tank of a diesel engine vehicle.

Intermediate the coupling 3 and the inlet 101 of the first chamber 100, is provided a so-called "ballast" or "accumulator" 4, hereinafter referred to as "the accumulator 4", for ensuring that, during operational use of the unit 1, the internal working pressure thereof is maintained at a required level regardless of the operating requirements of the associated diesel engine to which the subsequently-treated diesel oil is delivered.

As will be described in more detail hereinbelow, a pump and non-return valve are provided upstream of the accumulator 4, for pumping diesel oil to be treated into the first chamber 100 via the inlet 101.

Extending coaxially of the first chamber 100 is an electrical heating element 104 which projects upwardly from the base 103 thereof. This heating element 104 is connected to an electrical power supply, such as the battery of the associated vehicle, by an electric cable 105 and, also, is mounted in fluid tight relationship with respect to the base 103 of the chamber 100.

In accordance with the invention, the electrical heating element 104 is adapted to heat diesel oil pumped into the first chamber 100, via the inlet 101, to a temperature sufficient to volatilise at least some of the contaminants, for example, lighter hydrocarbons and/or dioxins and any water, contained in the diesel oil. That volatilization temperature is preferably in the range of 120° to 200° C.

At the top of the first chamber 100 is mounted, by means of a suitable gasket, a cap 115 defining therein a chamber 106 in communication with the interior of the first chamber 100 and, also, with an associated outlet 107.

Figure 5:
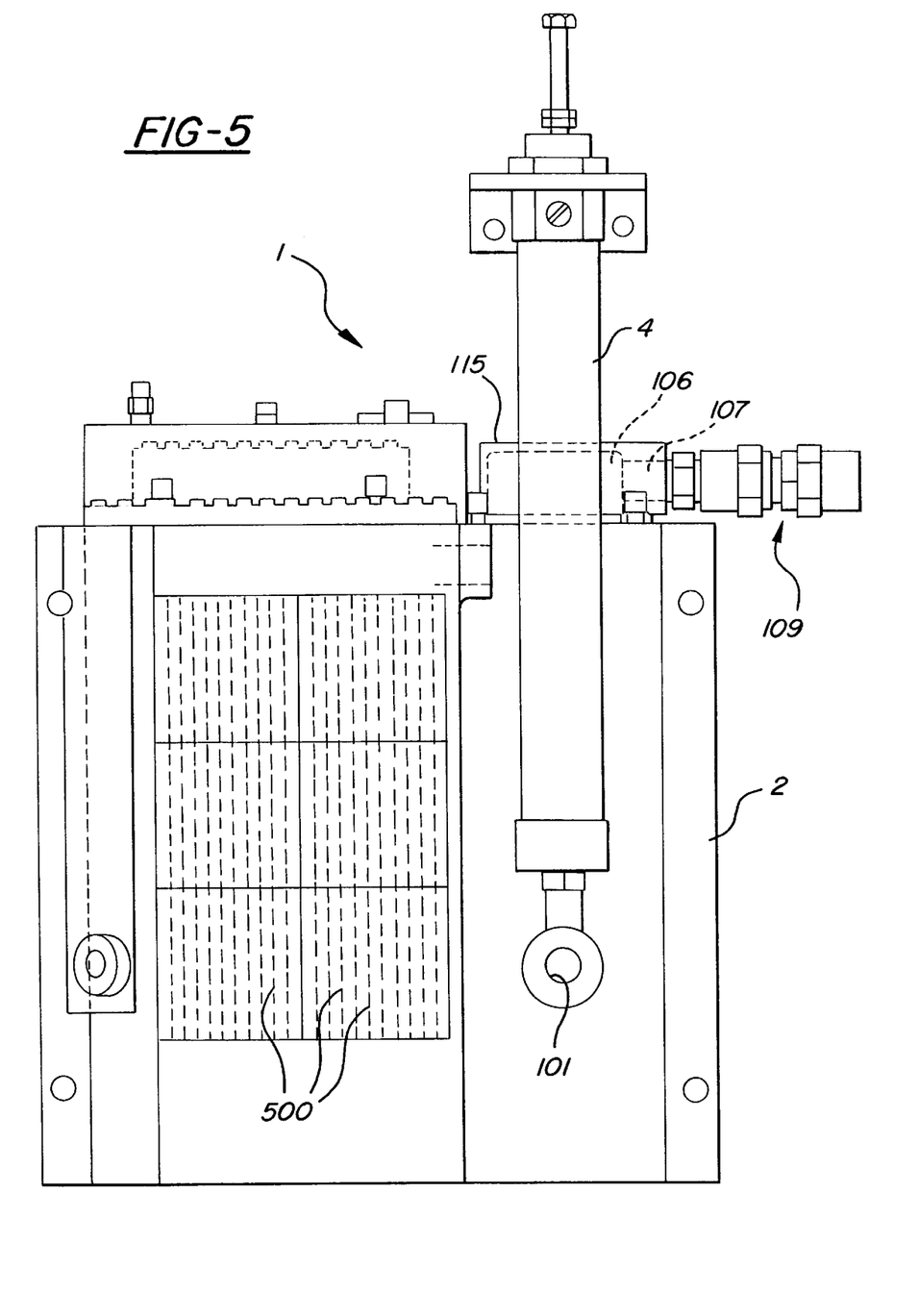
FIG. 5 is an elevational view of one side of the unit shown in FIGS. 1 to 4.

The exhaust chamber 106 communicates with the interior of the first chamber 100 via a PTFE filter membrane 108 which permits any contaminants, such as those described above, volatilized in the first chamber 100, to be exhausted from the unit 1 via the exhaust chamber 106 and outlet 107 through a non-return valve, indicated generally at 109 in FIG. 5, whilst also preventing any condensates from those volatilized contaminants from re-entering the heated diesel oil in the first chamber 100. Those volatilized contaminants may be exhausted to atmosphere or to a suitable container where they are condensed for subsequent removal.

Figure 6:
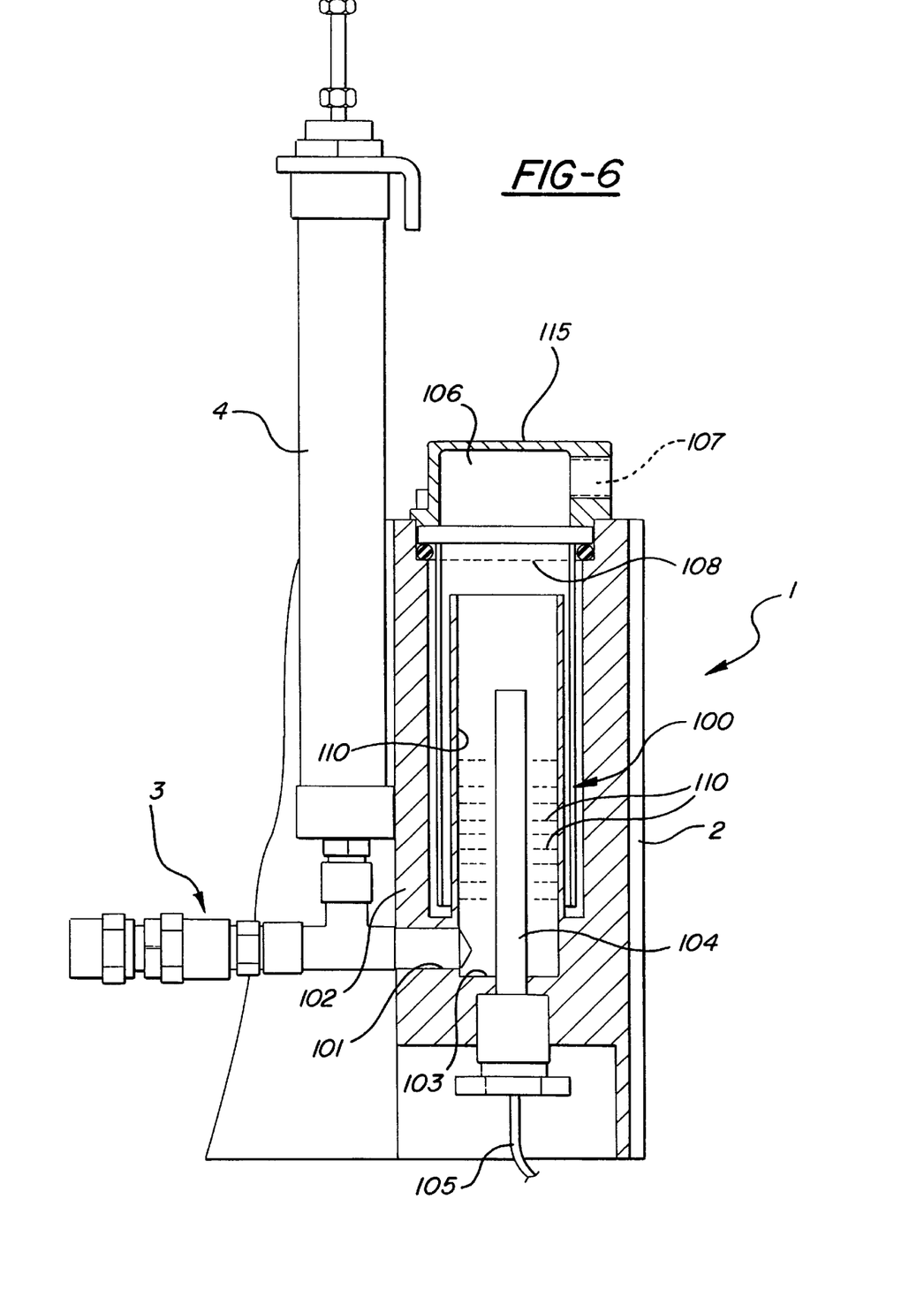
FIG. 6 is a partial view along the section D—D in FIG. 1.

In FIG. 6, optional baffles or fins 110 extending inwardly of the chamber 100, are shown in dashed lines, for agitating the diesel oil being heated in that chamber 100, to assist in the volatilization process. However, other suitable agitation means may be provided.

A downwardly inclined passage 122 constitutes an outlet for the first chamber 100 at the top region thereof and, also, an inlet for the second chamber 200.

Figure 10:
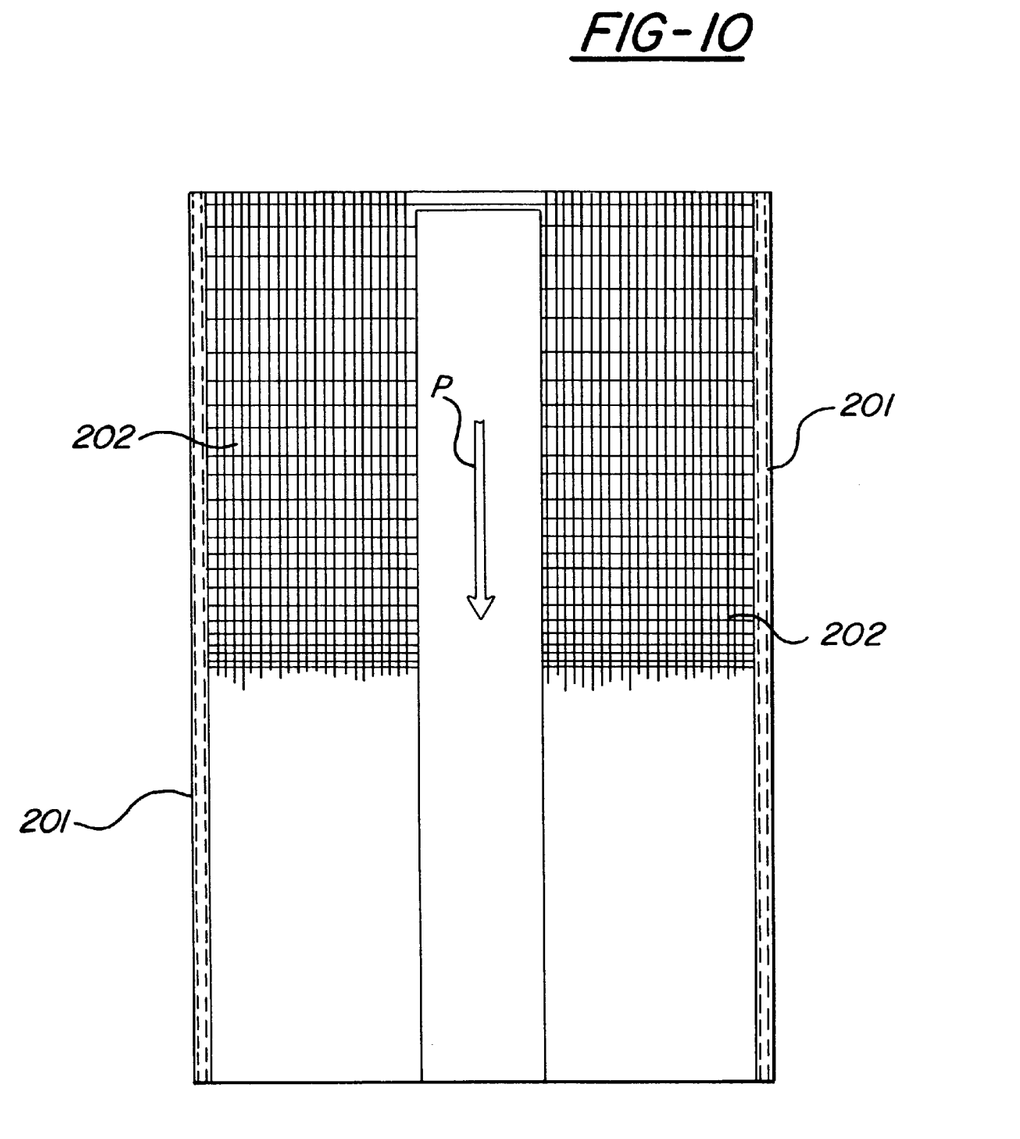
FIG. 10 is an elevational view of a two-stage filter used in the unit.

Within that second chamber 200, which is also generally cylindrical, is located a two-stage filtering means, as shown in FIG. 10, comprising a first-stage filter 201 in the form of a generally cylindrical, catalytic metal strainer constructed from a woven nickel-copper mesh having a porosity in the range of 5 microns to 10 microns.

Located concentrically within that first-stage, catalytic metal strainer 201 is a second-stage, mechanical filter 202 whose porosity is graduated in a continuous and decreasing manner from 3 microns to 0.3 microns.

The catalytic metal strainer 201 removes at least some of the remaining contaminants in the diesel oil, such remaining contaminants comprising aromatic compounds and at least some of any remaining dioxins. Also, it has been found that this first, catalytic metal strainer 201 either increases bonding between certain contaminants within the diesel oil, whilst also reducing such bonding between other contaminants. Bonding between molecules of aromatic contaminants tends to be increased, to form heavier aromatic compounds which can be removed by the mechanical filter 202, along with any particulate materials in the diesel oil either by physical retention or absorption.

The second-stage, mechanical filter 202 is preferably of polypropylene in cartridge form.

Extending coaxially of the second chamber 200, and hence of the first-stage, catalytic metal strainer 201 and the second-stage, graduated mechanical filter 202, is an elongate thermistor probe 203 whose lower end extends through the base 205 of a recessed portion 204 at the bottom of the second chamber 200. This probe 203 is rated at a temperature of 250° C. maximum and has an operating power of 5 volts, whilst being connected electrically to a suitable power supply via a cable 206.

A sealing cap 207 for the chamber 200 is provided with a bleed nipple 208 in communication with the interior thereof.

Mounted within another recessed portion 210 at the bottom of the second chamber 200 and to one side thereof, are, in combination, a pressure sensor rated at 300 psi maximum and a temperature sensor rated at 250° C. maximum with a combined operating power of 5 volts at 10 micro ohms. This combination pressure/temperature sensor 209 is used to monitor the pressure and temperature of the diesel oil at the bottom of the second chamber 200 as it exits therefrom into a third chamber 300 and can be accessed from beneath the chamber 200 via a further recess 211.

Figure 1:
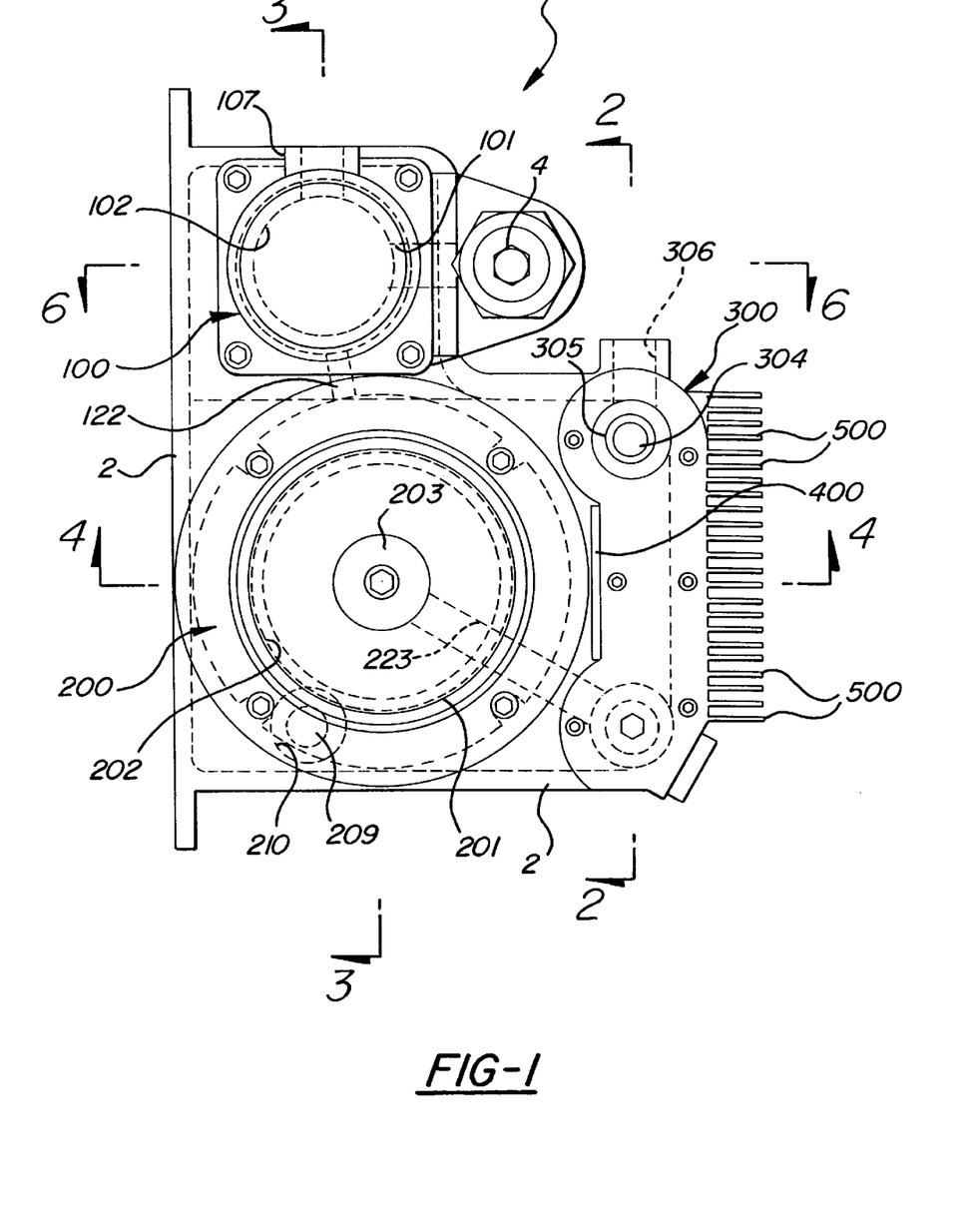
FIG. 1 is a plan view of a unit for treating diesel oil prior to its delivery to an associated diesel engine.
Figure 2:
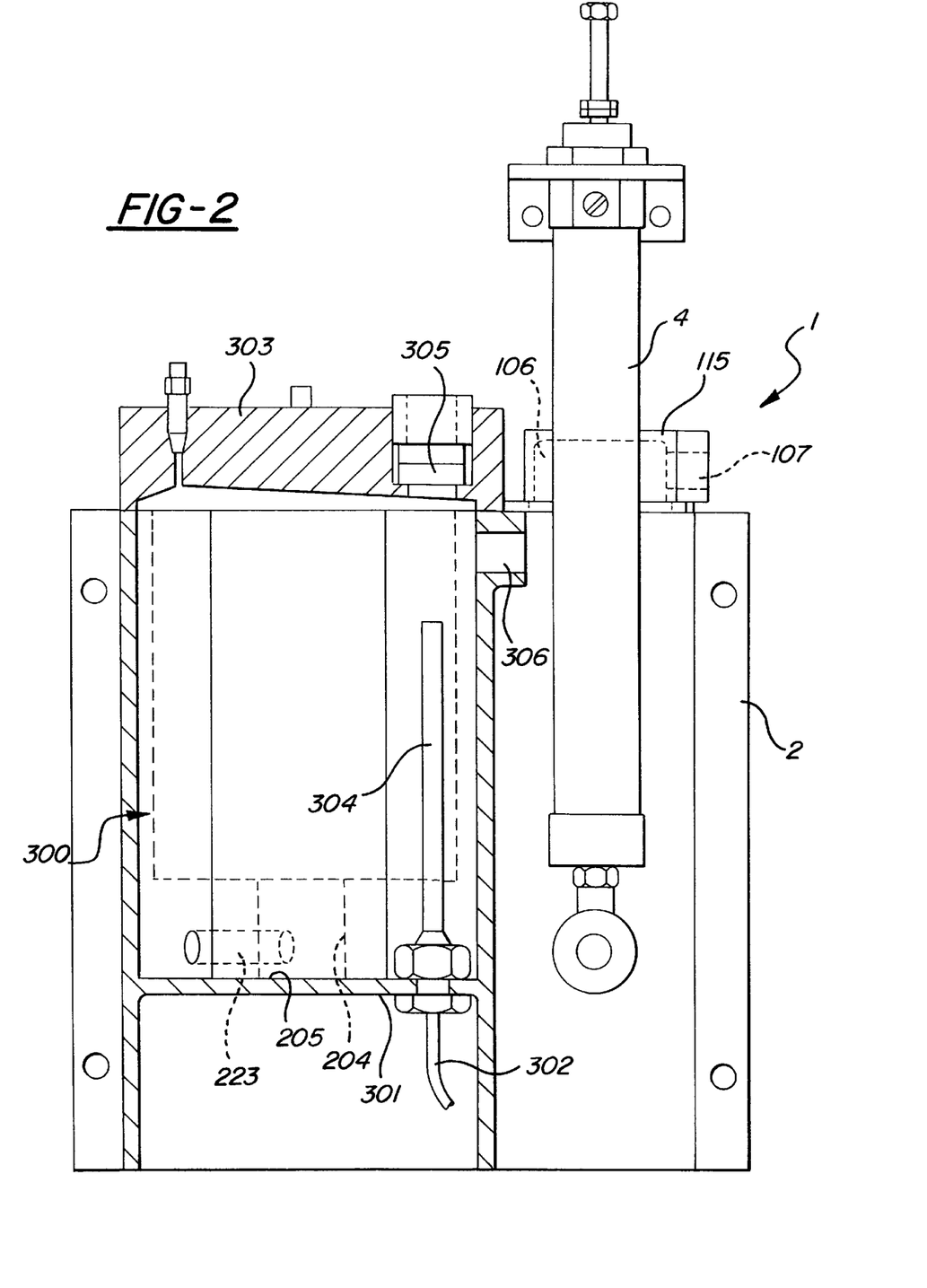
FIG. 2 is a view along the section B—B in FIG. 1.

A further passage 223, as shown in FIGS. 1 and 2, extends from the recessed base portion 204 at the bottom of the second chamber 200 to one side of the bottom of the third chamber 300, to inter-communicate those two chambers 200, 300, and constitutes an outlet for the second chamber 200 and an inlet for the third chamber 300.

At the other side of the third chamber 300 is provided an upwardly extending, elongate electrical heating element 304, as shown in FIGS. 1 and 2, passing through the bottom wall 301 thereof, in fluid tight manner. This heating element 304 is also connected to a suitable power supply by means of a further cable 302.

At the top of that other side of the third chamber 300 and mounted in a sealing cap 303 therefor is another combination of pressure and temperature sensors 305, the pressure sensor being rated again at 300 psi maximum and the temperature sensor, at 200° C. maximum, with an operating power of 5 volts at 10 micro ohms. This combination pressure/temperature sensor 305 is used to monitor the pressure and temperature of the treated diesel oil, and particularly the pressure, to determine any variations of the interior pressure of the unit, with a view to providing a warning of any potential blockage therein.

Between the respective confronting wall portions of the second chamber 200 and the third chamber 300 is provided a passageway 400 through which a coolant fluid, such as, cold air or water, can be passed. Also, the remote, outer wall of the third chamber 300 is provided with a plurality of cooling fins 500.

The purpose of this third, temperature control chamber 300 is to effectively "reconstitute" the previously-heated and filtered diesel oil by either rapid cooling, by means of coolant air or water being passed through the passageway 400 in combination with the cooling fins 500 or by boost heating using the heating element 304, to bring the temperature, and hence viscosity, of the diesel oil to a desired level for subsequent delivery to the associated diesel engine.

The heating element 304 can be operated at a temperature of, say, 50° C. to 100° C., at a power rating of 15 volts, for heating the previously-heated and filtered diesel oil. However, if the so-treated diesel oil is to be cooled, then the heating element 304 will be rendered inoperative.

An outlet 306 is provided at the top of the said other side of the chamber 300 for passing the treated diesel oil to the injectors of an associated diesel engine, via a proportionality valve, as will be described hereinbelow.

Figure 7:
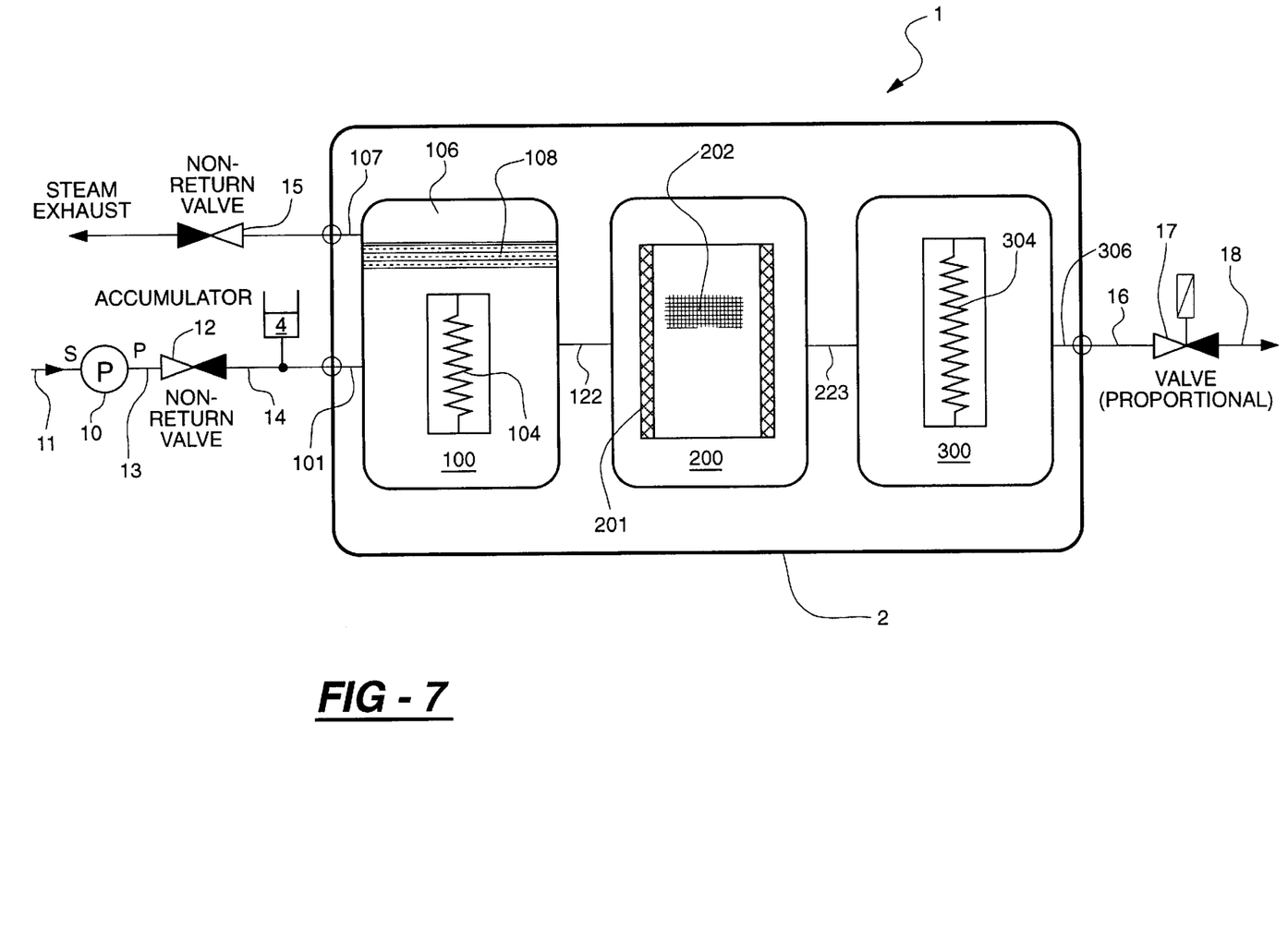
FIG. 7 is a diagrammatic illustration of the unit shown in FIGS. 1 to 6.

In FIG. 7, which is diagrammatic and not to scale, there is shown the unit 1 with the first heating chamber 100, second filter chamber 200 and the temperature control chamber 300 located in series and within the casing 2, to provide a self-contained unit.

In more detail, a pump 10 for drawing diesel oil from the fuel tank of the vehicle via a pipe 11, has, downstream thereof, a non-return valve 12 connected thereto by a pipe 13. In turn, a pipe 14 connects the non-return valve 12 to the inlet 101 of the first, heating chamber 100. The accumulator 4 is connected to that pipe 14 and, hence, to the inlet 101. As described above, the electrical heating element 104 is located within the chamber 100, along with the filter membrane 108. Also shown are the exhaust chamber 106 and outlet 107 for exhausting contaminants volatilized in the chamber 100 to the atmosphere or a condensate tank via a non-return valve 15.

The passage 122, which constitutes the outlet for the first, heating chamber 100 and the inlet for the second, filter chamber 200 is shown, together with the two-stage filter means in that second chamber 200, namely, the first stage in the form of the catalytic metal strainer 201 and the second stage provided by the graduated mechanical filter 202.

That two-stage filter means of the second, filter chamber 200 is shown in more detail in FIG. 10, with the thermistor probe 203 omitted. The mechanical filter 202, which is located concentrically within the catalytic metal strainer 201, is shown diagrammatically with its pore size decreasing in the direction of the arrow P.

Also shown in FIG. 7 is the passage 223 which constitutes the outlet for the second, filter chamber 200 and the inlet for the third, temperature control chamber 300 in which only the heating element 304 is shown. Any cooling means associated with that third chamber 300 has been omitted for reasons of clarity.

The outlet 306 of the chamber 300 has, connected downstream thereof via an outlet pipe 16, a proportionality valve 17 through which the treated diesel oil is fed to the injectors of the associated diesel engine via another pipe 18.

Figure 8:
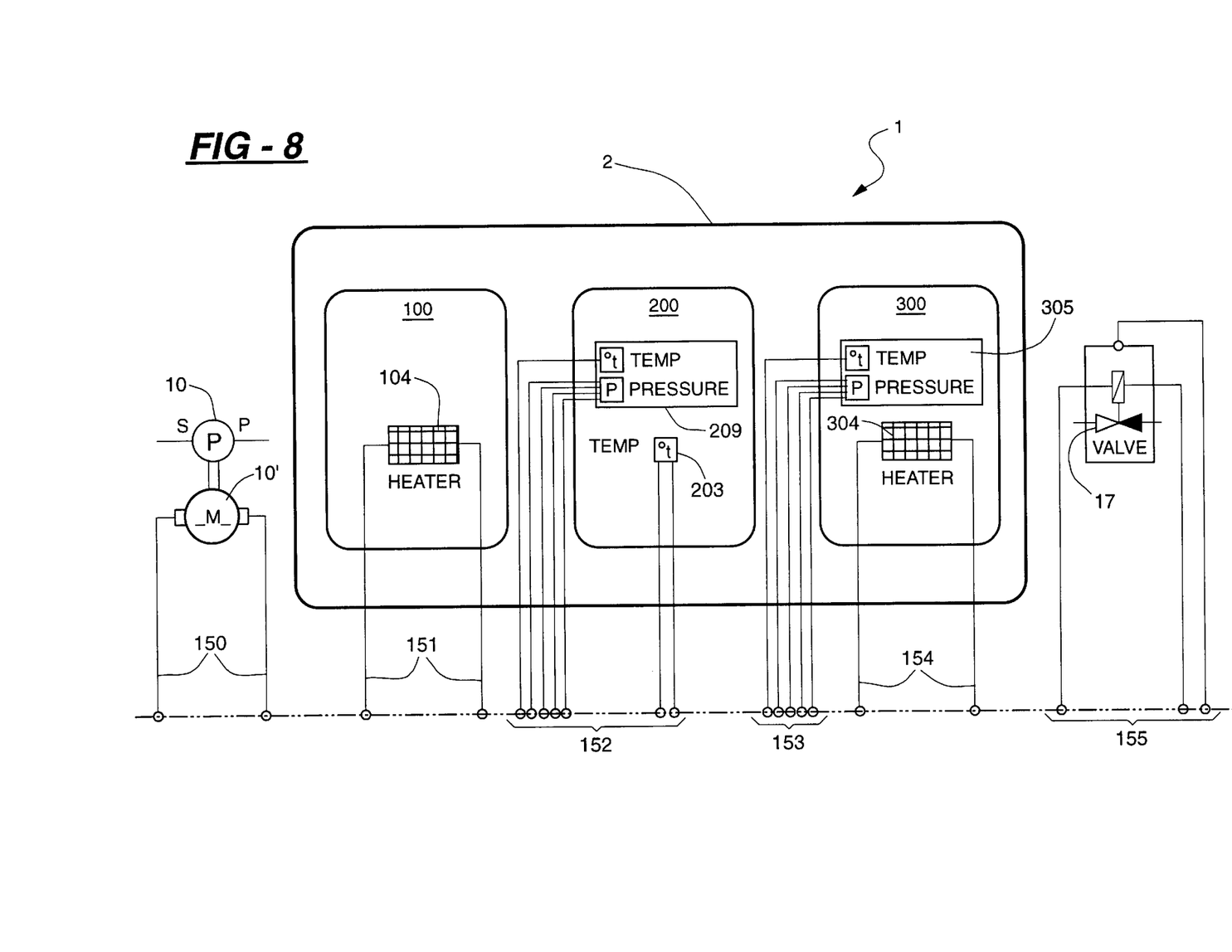
FIG. 8 is a diagrammatic illustration of circuit wiring associated with the unit shown in FIGS. 1 to 7.

In FIG. 8, there is shown a basic wiring diagram for the diesel oil treatment unit 1. A power supply 150 is provided for a motor 10' for driving the hydraulic pump 10 for supplying diesel oil to be treated to the inlet (not shown) of the first, heating chamber 100. The power supply 151 for the heater 104 of that first chamber 100 is shown, together with a plurality of respective power supply lines and output lines for the thermistor 203 and the combined pressure and temperature sensor 209, as indicated generally at 152.

Similar power and output lines for the combined pressure and temperature sensor 305 for the third, temperature control chamber 300 are indicated generally at 153, together with the power supply 154 for the heater 304 in that chamber 300.

Further power supplies indicated generally at 155 are provided for the proportionality valve 17 downstream of the outlet (not shown) of the chamber 300.

Figure 9:
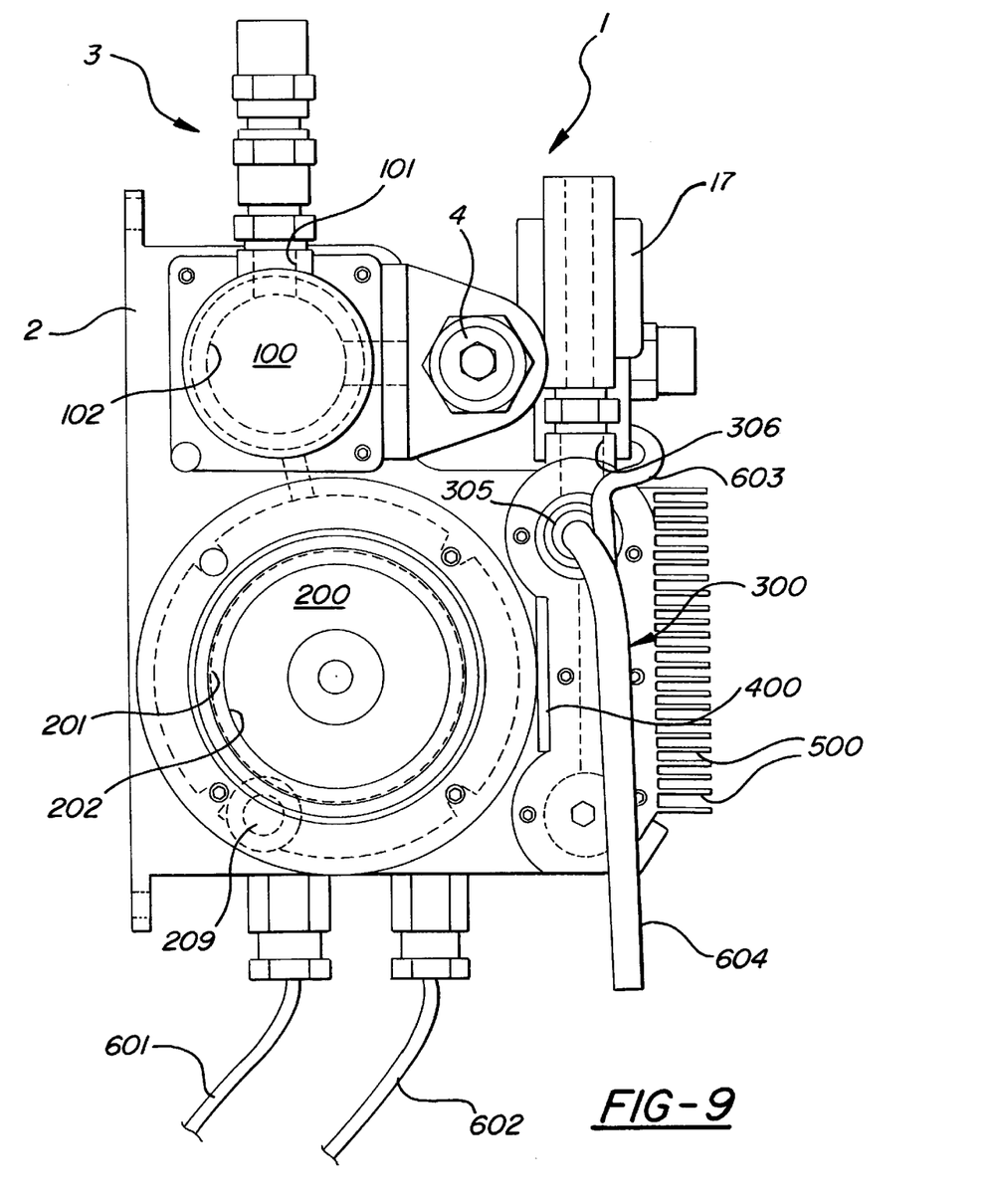
FIG. 9 is a plan view of a unit similar to that of FIG. 1 but with further components shown.

FIG. 9 is a similar view of the unit 1 to that of FIG. 1 but with the proportionality valve 17 shown and respective cabling 601, 602, 603 and 604 which connects the cables 105, 206, 302 for various electrical components of the unit 1 to corresponding power supplies and control circuitry.

Figure 11:
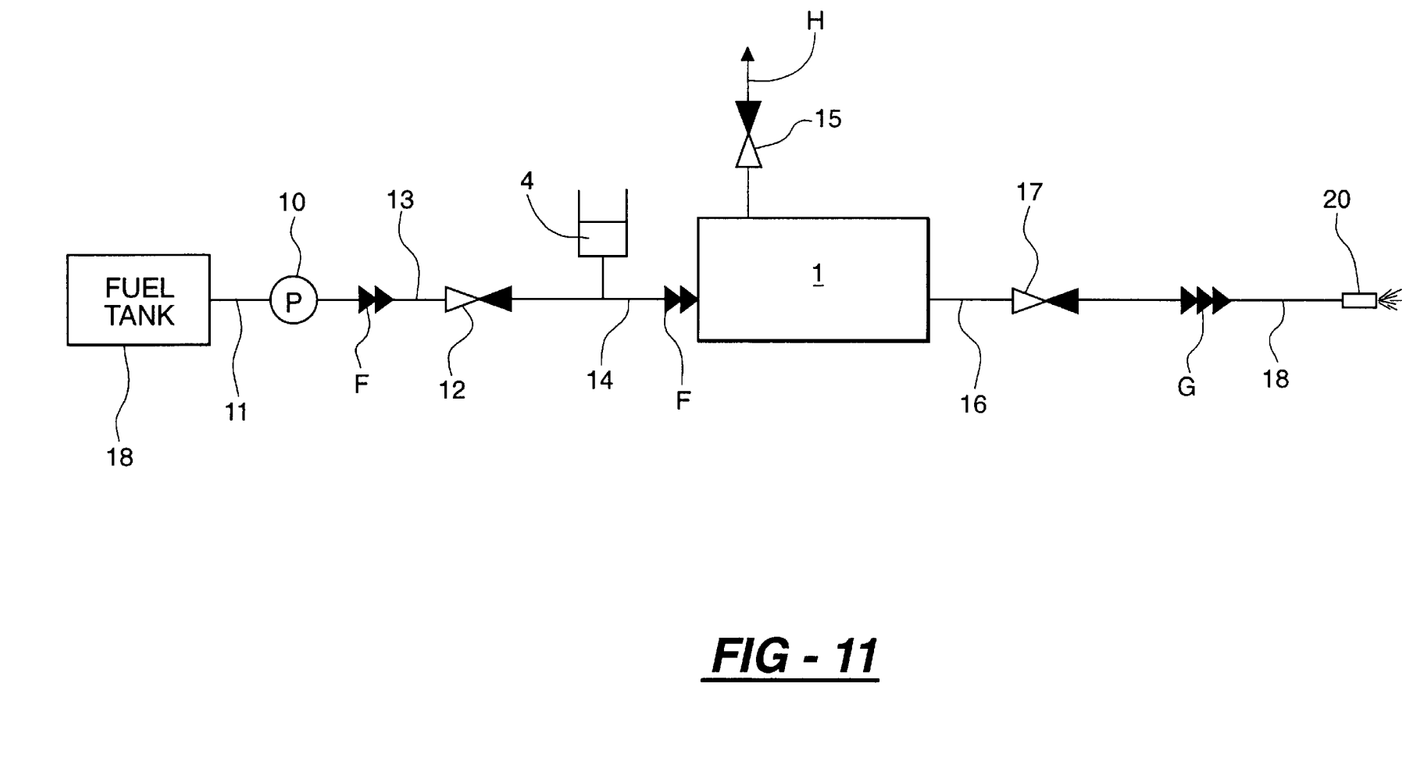
FIG. 11 is a diagrammatical illustration of the unit and associated operating components connected in the fuel line of a vehicle.

FIG. 11 shows a diagrammatic illustration of the diesel oil treatment unit 1 and its associated components, for example, the non-return valves 12 and 15, and the proportionality valve 17. The vehicle fuel tank is indicated at 18 whilst an injector of the engine of the vehicle is indicated at 20, with the direction of flow of the diesel oil from the fuel tank 18 to be treated by the unit 1 being shown by the double headed arrows F and the direction of flow of the treated diesel oil to the injector 20 being shown by the triple headed arrow G. The direction of flow of the contaminants volatilized in the first chamber 100 of the unit 1 and exhausted therefrom via the non-return valve 15 is indicated by the single headed arrow H.

In operation of the diesel oil treatment unit 1, when connected in the fuel line of an associated vehicle, as shown in FIG. 11, diesel oil is drawn from the vehicle fuel tank 18 by the pump 10 via the pipe 11 and is then passed, under pressure, to the non-return valve 12 via the pipe 13 and, subsequently, to the inlet 101 of the first, heating chamber 100 of the unit 1 via the pipe 14.

In the first, heating chamber 100, the untreated diesel oil is heated to a temperature in the range of 100° C. to 200° C., and possibly higher, to volatilise contaminants, such as any water, lighter hydrocarbons and/or dioxins, whose respective boiling points lie within that temperature range. The diesel oil is also subjected to a pressure, by means of the pump 10, in the range of 80 psi to 300 psi. This pressure is preferably maintained throughout the treatment of the diesel oil within the unit 1.

Such volatilized contaminants are exhausted to the atmosphere or a condensate container via the membrane 108 in the chamber 100 and the exhaust chamber 106 and exhaust outlet 107 thereof, and subsequently via the non-return valve 15.

The so-heated diesel oil is then pumped into the second, filter chamber 200 via the passage 122, where it is first subjected to catalytic filtering by the first-stage, catalytic strainer 201, to remove from the diesel oil at least some of the remaining contaminants, for example, mainly aromatic compounds and at least some of any remaining dioxins.

As discussed above, it has been found that this first-stage catalytic filtering of the heated diesel oil either increases bonding between certain contaminants, whilst also reducing such bonding between other contaminants in the diesel oil. With the aromatic contaminants, bonding between molecules thereof tends to be increased, to form heavier aromatic contaminants.

Thereafter, the diesel oil is passed through the second-stage mechanical filter 202, to remove those heavier aromatic contaminants, as well as any particulate contaminants, such as dirt or metal particles.

As also discussed above, this second-stage filtering of the diesel oil removes contaminants therefrom by one or both of two ways, namely, by physical retention, for example, the heavier aromatic compounds formed at the first-stage, catalytic filter 201, or by absorption of other contaminants or both.

After such two-stage filtration of the diesel oil, it is either cooled or heated, for example and in the latter, by the heating element 304 in the third, temperature control chamber 300 after being passed into that chamber via the passage 223 from the second, filter chamber 200. This cooling or heating of the previously-heated and filtered diesel oil is necessary to maintain or return the diesel oil to an optimum temperature and viscosity suited to the particular type of engine to which it is subsequently delivered via the fuel line, namely, the pipe 16, the proportionality valve 17, the further pipe 18 and the injector 20.

The inventive, diesel oil treatment unit is designed as an "intelligent" system capable of delivering the precise amount of diesel oil at the required temperature and viscosity, regardless. of external influences from the environment or other influences resulting from the operational demands of the associated engine. To achieve this, the unit 1 may be fitted with a processor unit programmed to monitor the operation of the treatment unit as well as that of the associated engine, and used in conjunction with the electronic management system of the vehicle itself.

Figure 12:
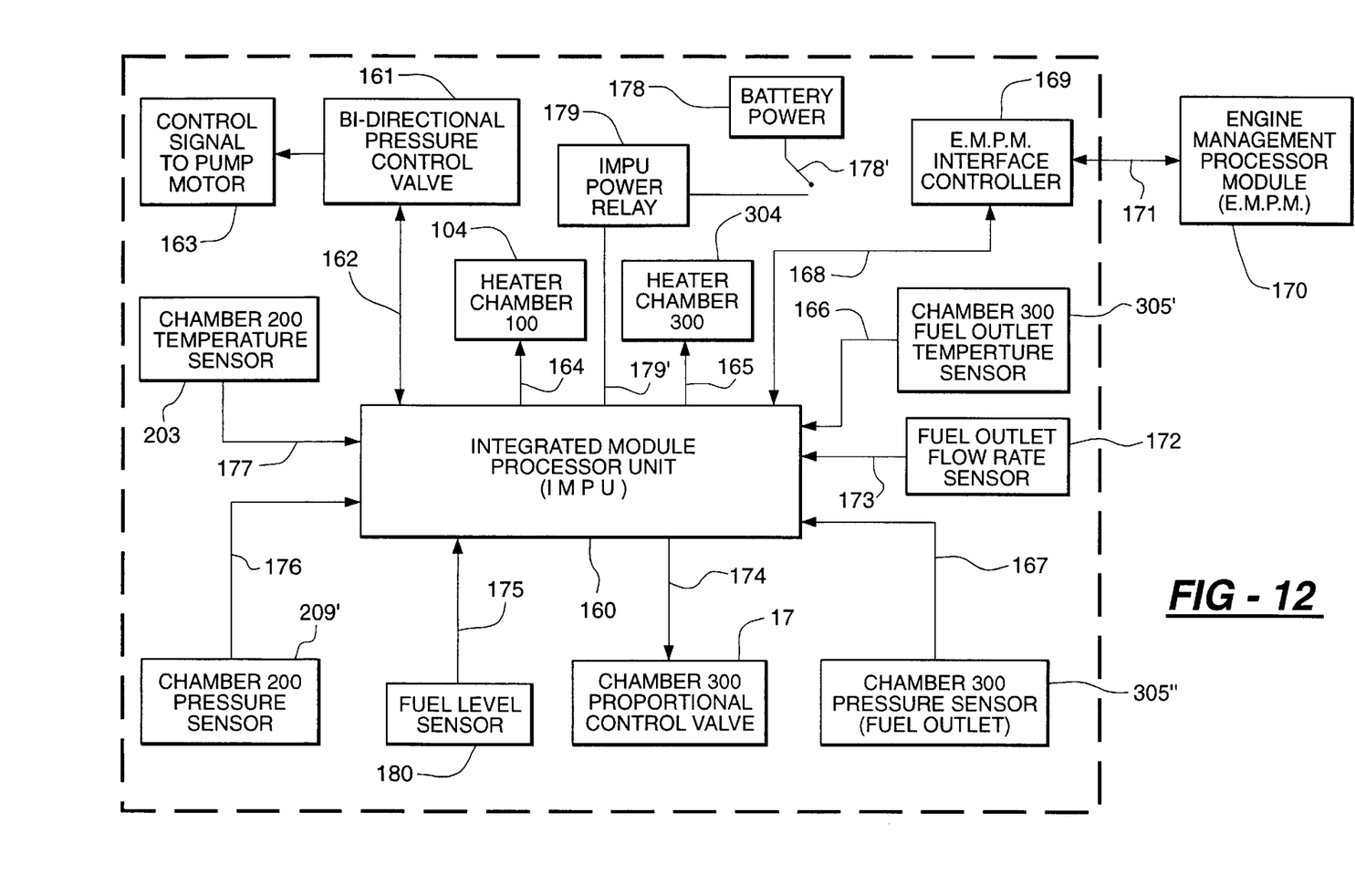
FIG. 12 is a block diagram of a control circuitry unit for the inventive fuel oil treatment unit.

Thus, and as shown in FIG. 12, an integrated module processor unit 160 (hereinafter referred to as "the IMPU") is connected to various components of the diesel oil treatment unit 1.

In more detail, a bi-directional pressure control valve 161 is connected, at 162, to the IMPU 160, for controlling the accumulator 4, whilst also providing a control signal at 163 for the motor 10' of the pump 10. That control signal 163 to the pump motor 10' ensures that the pump 10 produces the required flow of diesel oil, thereby maintaining the correct pressure within the treatment unit 1.

Operation of the heating element 104 in the first, heating chamber 100 is controlled from the IMPU 160 by line 164, whilst operation of the heating element 304 in the third temperature control chamber 300 is controlled in a similar manner by line 165.

The temperature sensor 305' of the combination pressure/temperature sensor 305 located adjacent the outlet 306 of the third, temperature control chamber 300, has its output connected to the IMPU 160 by line 166. Similarly, the pressure sensor 305" of that combination pressure/temperature sensor 305 adjacent the outlet 306 of the third, temperature control chamber 300, has its output connected to the IMPU 160 by line 167.

The IMPU 160 is connected, via line 168, to a controller 169 providing an interface for the IMPU 160 with the engine management processor module (EMPM) 170, via line 171.

A diesel oil flow rate sensor 172, which is preferably incorporated in the proportionality valve 17 downstream of the outlet 306 of the third, temperature control chamber 300, has its output connected to the IMPU 160 by line 173.

The proportionality valve 17 is controlled by the IMPU 160 via line 174, for adjustment of that valve 17 between its fully open and fully closed positions in a continuous manner.

A fuel level sensor 180 has its signal output connected to the IMPU 160 via line 175. That sensor 180 is incorporated in the fuel tank 18 of the vehicle. As the inventive diesel oil treatment unit should not be emptied of diesel oil, under normal working conditions, then a "low fuel" warning is provided when only 5 liters of diesel oil are detected in the vehicle fuel tank 18. When only 2 liters of diesel oil are so-detected by the sensor 180, the treatment unit 1 closes down to stop the engine of the vehicle, as if the vehicle had run out of fuel.

The pressure sensor 209' of the combination pressure/temperature sensor 209, which is located exterior of the catalytic metal strainer 201 and the graduated mechanical filter 202 in the second, filter chamber 200, preferably downstream thereof, has its output connected to the IMPU 160 via line 176.

Figure 3:
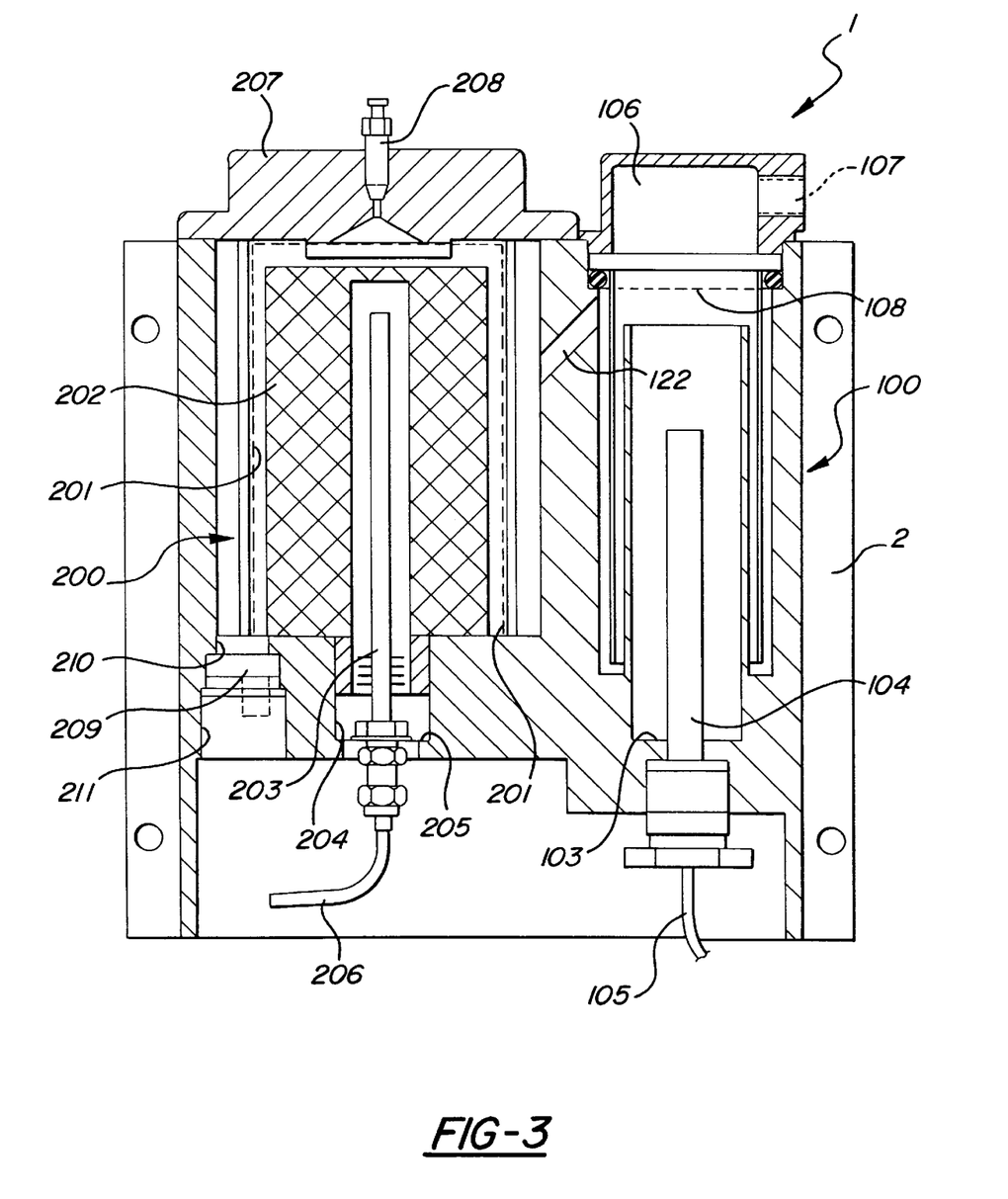
FIG. 3 is a view along the section C—C in FIG. 1.
Figure 4:
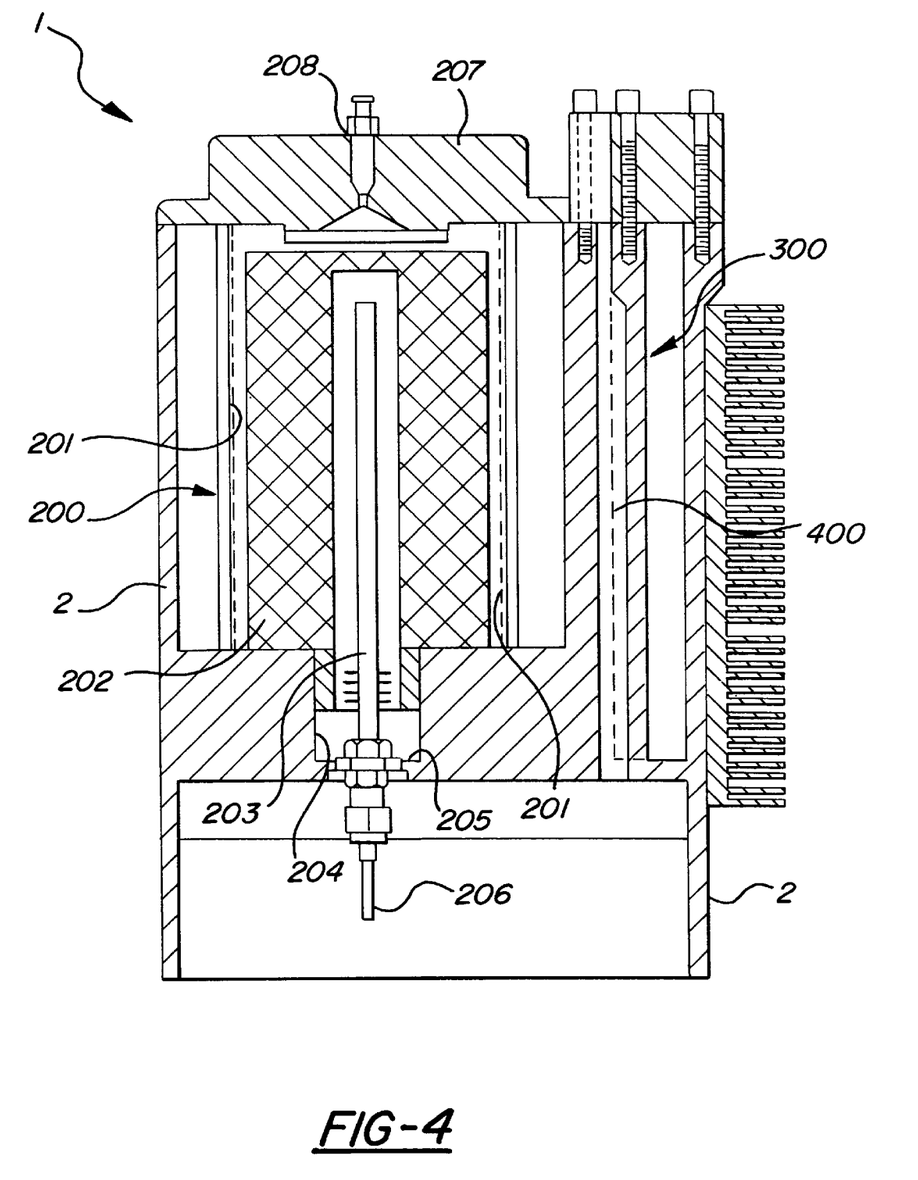
FIG. 4 is a view along the section A—A in FIG. 1.

The thermistor probe 203, which extends generally coaxially of the mechanical filter 202 in chamber 200 and acts as a temperature sensor, has its output connected to the IMPU 160 via line 177 (cable 206 in FIGS. 3 and 4). The temperature of the diesel oil sensed by the thermistor probe 203 is used to control the heater 104 in the first, heating chamber 100.

As an integrated unit, the IMPU 160 monitors continuously all conditions of the diesel oil being treated by the inventive unit 1, to maintain optimum diesel oil flow rates, temperature and viscosity thereof, as required by the diesel engine to which the treated diesel oil is delivered via injectors 20. Optimum levels of diesel oil characteristics and precise quantities thereof are controlled by constant feedback information from the EMPM 170 of the vehicle and, inter alia, the temperature, pressure, flow rate and diesel oil level sensors 305', 203, 305", 209', 172 and 180, respectively, whose outputs are fed to the IMPU 160.

Power for the IMPU 160 is provided from the battery 178 of the vehicle via a switch 178', a power relay 179 and line 179'.

For the avoidance of any doubt, the word "vaporization", and any derivatives thereof, is used throughout this specification to embrace not only the vaporization of any contaminants into a vapour state but also the boiling of any contaminants into a gaseous state.

We claim:
1. A method of treating a fuel oil containing contaminants, comprising heating the fuel oil to a temperature sufficient to volatilize at least some of the contaminants contained therein and subsequently filtering the heated fuel oil in two stages using catalytical filtering then mechanical filtering; wherein catalytic and mechanical filter elements are disposed in concentric series, to remove therefrom at least some of the remaining, unvolatilized contaminants therein.

* * * * *